(12) United States Patent
Verma et al.

(10) Patent No.: US 7,933,274 B2
(45) Date of Patent: Apr. 26, 2011

(54) QUALITY OF SERVICE IN A HOME NETWORK

(75) Inventors: Sanjeev Verma, San Jose, CA (US); Alan Messer, Los Gatos, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 153 days.

(21) Appl. No.: 12/252,143

(22) Filed: Oct. 15, 2008

(65) Prior Publication Data

US 2009/0231999 A1 Sep. 17, 2009

Related U.S. Application Data

(60) Provisional application No. 61/037,290, filed on Mar. 17, 2008.

(51) Int. Cl.
*H04L 12/56* (2006.01)
(52) U.S. Cl. .................................. 370/395.21; 370/235
(58) Field of Classification Search ............ 370/395.21, 370/235, 230; 709/223, 224, 240
See application file for complete search history.

(56) References Cited

U.S. PATENT DOCUMENTS

| | | | | |
|---|---|---|---|---|
| 6,331,986 B1 * | 12/2001 | Mitra et al. | ................... | 370/468 |
| 7,444,398 B1 * | 10/2008 | Matthews | ..................... | 709/224 |
| 2007/0253427 A1 * | 11/2007 | Stirbu | ..................... | 370/395.21 |
| 2008/0123661 A1 * | 5/2008 | Steets et al. | ............. | 370/395.21 |
| 2008/0212495 A1 * | 9/2008 | Stirbu | ........................... | 370/254 |

OTHER PUBLICATIONS

UPnP Forum, UPnP Device Architecture 1.0, Apr. 24, 2008, pp. 1-77.

* cited by examiner

*Primary Examiner* — Ricky Ngo
*Assistant Examiner* — Chandrahas Patel
(74) *Attorney, Agent, or Firm* — Beyer Law Group LLP

(57) ABSTRACT

In one embodiment, a method for establishing Quality of Service (QoS) in a home network is provided. The method comprises: receiving a request for bandwidth in a virtual private network (VPN); receiving a traffic specification of an application on a control point retrieving a traffic policy; retrieving path characteristics of the VPN; and reserving resources in the VPN based on the path characteristics, the traffic policy, and the traffic specification.

15 Claims, 4 Drawing Sheets

QUALITY OF SERVICE IN A HOME NETWORK

CROSS-RELATION TO RELATED APPLICATION

This application claims priority to provisional patent application Ser. No. 61/037,290, entitled "METHOD AND APPARATUS TO SUPPORT QoS IN UPnP REMOTE ACCESS", filed Mar. 17, 2008, herein incorporated by reference in its entirety.

BACKGROUND OF THE INVENTION

1. Field of the Invention

The present invention relates to computing. More particularly, the present invention relates to the application of Quality of Service to a Home Network.

2. Description of the Related Art

Universal Plug and Play (UPnP) is a distributed, open networking architecture that allows devices to connect seamlessly and to simplify the implementation of networks in the home (data sharing, communications, and entertainment) and corporate environments. UPnP achieves this by defining and publishing UPnP device control protocols built upon open, Internet-based communication standards.

UPnP has grown in popularity of late in part due to the rise in popularity of media servers. Media servers are small computers that store multiple types of content (e.g., photos, music, videos, etc.). The content may then be streamed from a media server to one or more control points (e.g., iPod, television set, etc.).

As an example, a "Media Server" device might contain a significant portion of the homeowner's audio, video, and still-image library. In order for the homeowner to enjoy this content, the homeowner must be able to browse the objects stored on the Media Server, select a specific one, and cause it to be "played" on an appropriate rendering device.

For maximum convenience, it is highly desirable to allow the homeowner to initiate these operations from a variety of User Interface (UI) devices. In most cases, these UI devices will either be a UI built into the rendering device, or a standalone UI device such as a wireless PDA or tablet. In other cases, the home network user interface device could be more remote and communicate with the home network through a tunneling mechanism on the Internet.

In the field of computer networking and other packet-switched telecommunication networks, the traffic engineering term quality of service (QoS) refers to resource reservation control mechanisms. Quality of service is the ability to provide different priority to different applications, users, or data flows, or to guarantee a certain level of performance to a data flow. For example, a required bit rate, delay, jitter, packet dropping probability and/or bit error rate may be guaranteed. Quality of service guarantees are important if the network capacity is insufficient, especially for real-time streaming multimedia applications such as voice over IP, online games and IP-TV, since these often require fixed bit rate and are delay sensitive, and in networks where the capacity is a limited resource, for example in cellular data communication. In the absence of network congestion, QoS mechanisms are not required.

A network or protocol that supports QoS may agree on a traffic contract with the application software and reserve capacity in the network nodes, for example during a session establishment phase. During the session it may monitor the achieved level of performance, for example the data rate and delay, and dynamically control scheduling priorities in the network nodes. It may release the reserved capacity during a tear down phase.

Currently, the only QoS services that support UPnP are geared only towards Local Area networks, enforcing QoS using Layer 2 technologies. However, remote user devices that access the home network through a tunneling mechanism such as a virtual private network (VPN) provide a dynamic environment with time-varying bandwidth and path latency that are not anticipated by existing UPnP QoS solutions.

SUMMARY OF THE INVENTION

In one embodiment, a method for establishing Quality of Service (QoS) in a home network is provided. The method comprises: receiving a request for bandwidth in a virtual private network (VPN); receiving a traffic specification of an application on a control point retrieving a traffic policy; retrieving path characteristics of the VPN; and reserving resources in the VPN based on the path characteristics, the traffic policy, and the traffic specification.

In another embodiment, a system for establishing Quality of Service (QoS) in a home network is provided, the system comprising: one or more control points; one or more QoS devices; a QoS manager coupled to the one or more control points and the one or more QoS devices, the QoS manager configured to: receive a request for bandwidth in a virtual private network (VPN); receive a traffic specification of an application on the control point; retrieve traffic policy; retrieve path characteristics of the VPN; and reserve resources in the VPN based on the path characteristics, the traffic policy, and the traffic specification.

In another embodiment, a system for establishing Quality of Service (QoS) in a home network is provided, the system comprising: means for receiving a request for bandwidth in a virtual private network (VPN); means for receiving a traffic specification of an application on the control point; means for retrieving a traffic policy; means for retrieving path characteristics of the VPN; and means for reserving resources in the VPN based on the path characteristics, the traffic policy, and the traffic specification.

In another embodiment, a program storage device readable by a machine tangibly embodying a program of instructions executable by the machine to perform a method for establishing Quality of Service (QoS) in a home network is provided, the method comprising: receiving a request for bandwidth in a virtual private network (VPN); receiving a traffic specification of an application on a control point; retrieving a traffic policy; retrieving path characteristics of the VPN; and reserving resources in the VPN based on the path characteristics, the traffic policy, and the traffic specification.

DETAILED DESCRIPTION OF SPECIFIC EMBODIMENTS

Figure 1:
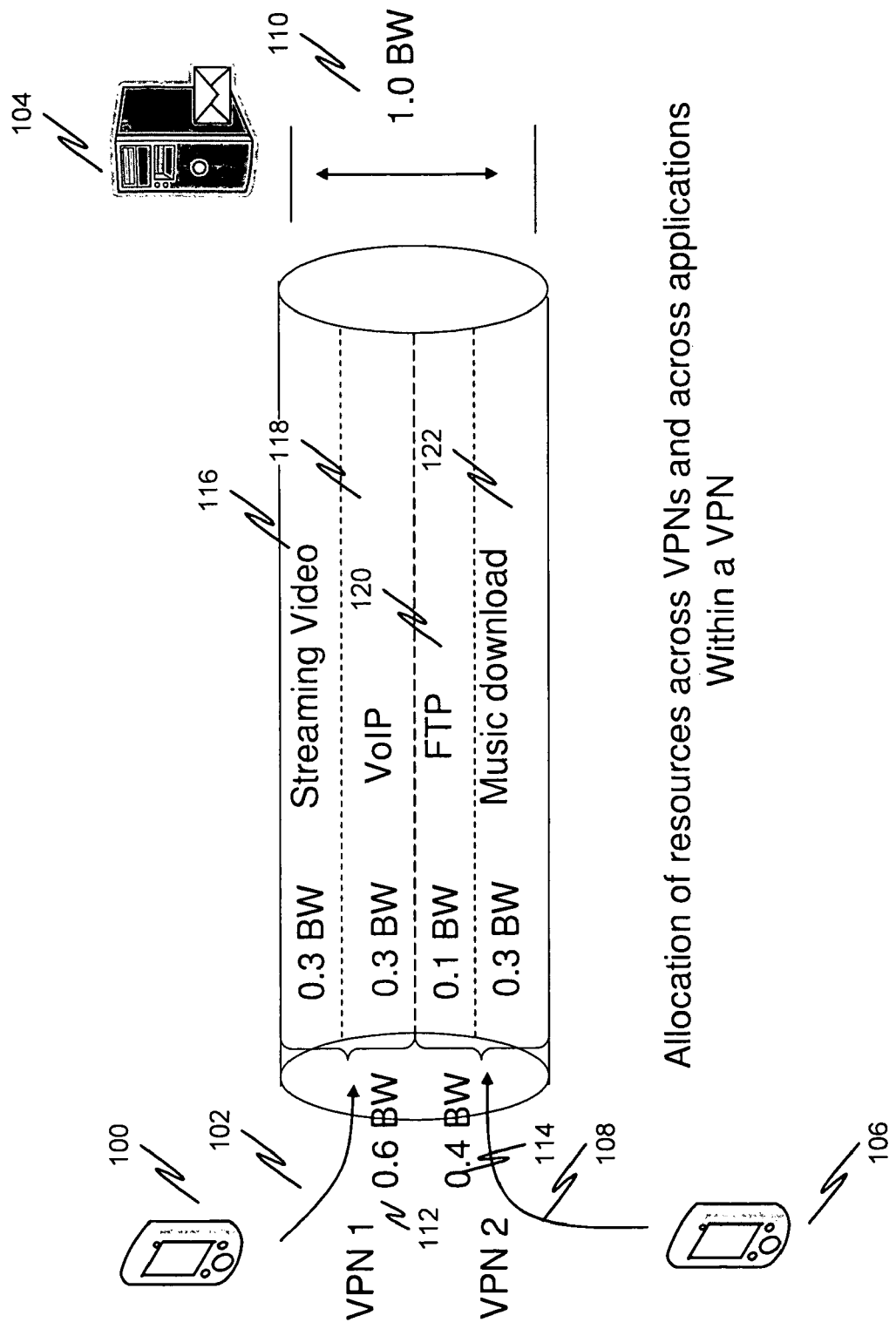
FIG. 1 is a diagram illustrating an example of reserving bandwidth for multiple VPNs and across applications within a VPN in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

It should be noted that the term "home networking" as used throughout this document refers to a type of network that is commonly used in homes to connect media devices. There is no requirement, however, that this type of networking actually be used in homes, as it has equal applicability for use in businesses or other entities. As such, the term "home networking" shall not be construed as limiting any embodiments of the present invention to use in a home, and shall be interpreted as any type of local area network (LAN).

For purposes of this document, the term "control point" shall be interpreted to mean any client device in a home network. A "traffic specification" shall be interpreted to mean any indication of an application's requirements, preferences, or expectations regarding network traffic it plans on receiving and/or sending.

In an embodiment of the present invention, home networks such as UPnP networks are bridged with a QoS solution for the external network to provide a satisfactory QoS experience to remote users.

The QoS solution utilized may vary based on implementation. One such implementation utilizes a Differentiated Server (DiffServ) QoS solution. DiffServ is a computer networking architecture that specifies a simple, scalable and coarse-grained mechanism for classifying, managing network traffic and providing Quality of Service (QoS) guarantees on modern IP networks.

DiffServ operates on the principle of traffic classification, where each data packet is placed into a limited number of traffic classes, rather than differentiating network traffic based on the requirements of an individual flow. Each router on the network is configured to differentiate traffic based on its class. Each traffic class can be managed differently, ensuring preferential treatment for higher-priority traffic on the network.

The DiffServ model does not make judgment on what types of traffic should be given priority treatment since that is left up to the network operator. DiffServ simply provides a framework to allow classification and differentiated treatment. DiffServ does recommend a standardized set of traffic classes (discussed below) to make interoperability between different networks and different vendors' equipment simpler.

DiffServ relies on a mechanism to classify and mark packets as belonging to a specific class. DiffServ-aware routers implement Per-Hop Behaviors (PHBs), which define the packet forwarding properties associated with a class of traffic. Different PHBs may be defined to offer, for example, low-loss, low-latency forwarding properties or best-effort forwarding properties. All the traffic flowing through a router that belongs to the same class is referred to as a Behavior Aggregate (BA).

While DiffServ can be used to provide QoS over a wide area network, QoS is an end-to-end requirement necessitating interactions between mechanisms in both the local area (home) network and wide area network.

In an embodiment of the present invention, a number of steps are devised to set up QoS for UPnP requests, such as router advertisement (RS) requests. These steps include:

Setting up of a VPN between the UPnP remote client and the Home Network.

Reserving appropriate bandwidth across the VPN to support numerous applications between the remote UPnP client and the Home Network.

Reserving bandwidth inside the VPN for different applications based on their respective QoS requirements.

Selecting and keeping track of path parameters (e.g., Spare bandwidth, path latency, etc.) along external interfaces.

In an embodiment of the present invention, UPnP QoS setup is performed as follows. The UPnP remote device first sends a request to set up a VPN to the home network, requesting certain resources from the underlying network to meet the QoS requirements of its application(s). The amount of resources needed can be communicated either through UPnP Remote Access Transport Agent (RATA) service or through a customized Application Programming Interface (API). A number of applications running on the remote device will share the reserved bandwidth along the VPN.

Then a remote user starts an application and the remote device sends a QoS request to a QoS Manager in the home network. This request carries a traffic specification of the application.

The QoS Manager then obtains a traffic policy from a QoS Policy Holder.

The QoS Manager gets the path information from QoS devices to find the QoS devices, segments, and presence (or lack thereof) of VPN in the path from the source to the sink device.

The QoS Manager then asks the QoS device, which reports the virtual interface, through a customized API to initiate determination of path characteristics along the external interface. The QoS Device then interfaces with the underlying VPN technology to gather path characteristics such as available bandwidth and path latency.

The QoS Manager then asks QoS devices in the path for their QoS capabilities. The API returns available QoS in data structures along its different interfaces. The data structure values are derived from the "operating mode" of the underlying VPN technology along the virtual interface.

The QoS Manager then divides the QoS requirements among segments in the path from source to sink devices and determines the required resources (bandwidth) along the VPN based on VPN path characteristics and current QoS states at different QoS devices in the path. Additionally, the QoS manager maps applications to the UPnP QoS traffic importance number, which is then mapped to the QoS capabilities of underlying VPN (e.g., DiffServ QoS).

The QoS checks whether there are sufficient resources available across the corresponding virtual interface. If there are sufficient resources then QoS Manager then asks an appropriate QoS device to set up required QoS and updates the QoS status of the virtual interface. Otherwise the QoS manager checks whether there is enough spare bandwidth in the external interface. The QoS Manager may then borrow additional bandwidth from the external interface (e.g., add capability to the VPN) to admit the application based on its local policy. Note that in certain cases, the visited Internet Gateway Device (IGD) may not host the UPnP QoS device. In such cases, the Home IGD QoS device will be asked to set up the required QoS each time.

FIG. 1 is a diagram illustrating an example of reserving bandwidth for multiple VPNs and across applications within a VPN in accordance with an embodiment of the present invention. A first UPnP remote device 100 sets up a first VPN 102 with server 104. A second UPnP remote device 106 sets up a second VPN 108 with server 104. Assume that there is 1.0 Gigabytes of available bandwidth 110. These resources may be allocated between the two VPNs 102, 108, here reserving 0.6 Gb 112 of available bandwidth for first VPN 102 and 0.4 Gb 114 of available bandwidth for second VPN 108. Within first VPN 102, the reserved 0.6 Gb may be then further allocated across applications, here 0.3 Gb for Streaming Video 116 and 0.3 Gb for Voice over IP 118. Likewise, within second VPN 208, the reserved 0.4 Gb may be allocated with 0.1 Gb for a File Transfer Protocol (FTP) application 120 and 0.3 Gb for Music Download 122.

Figure 2:
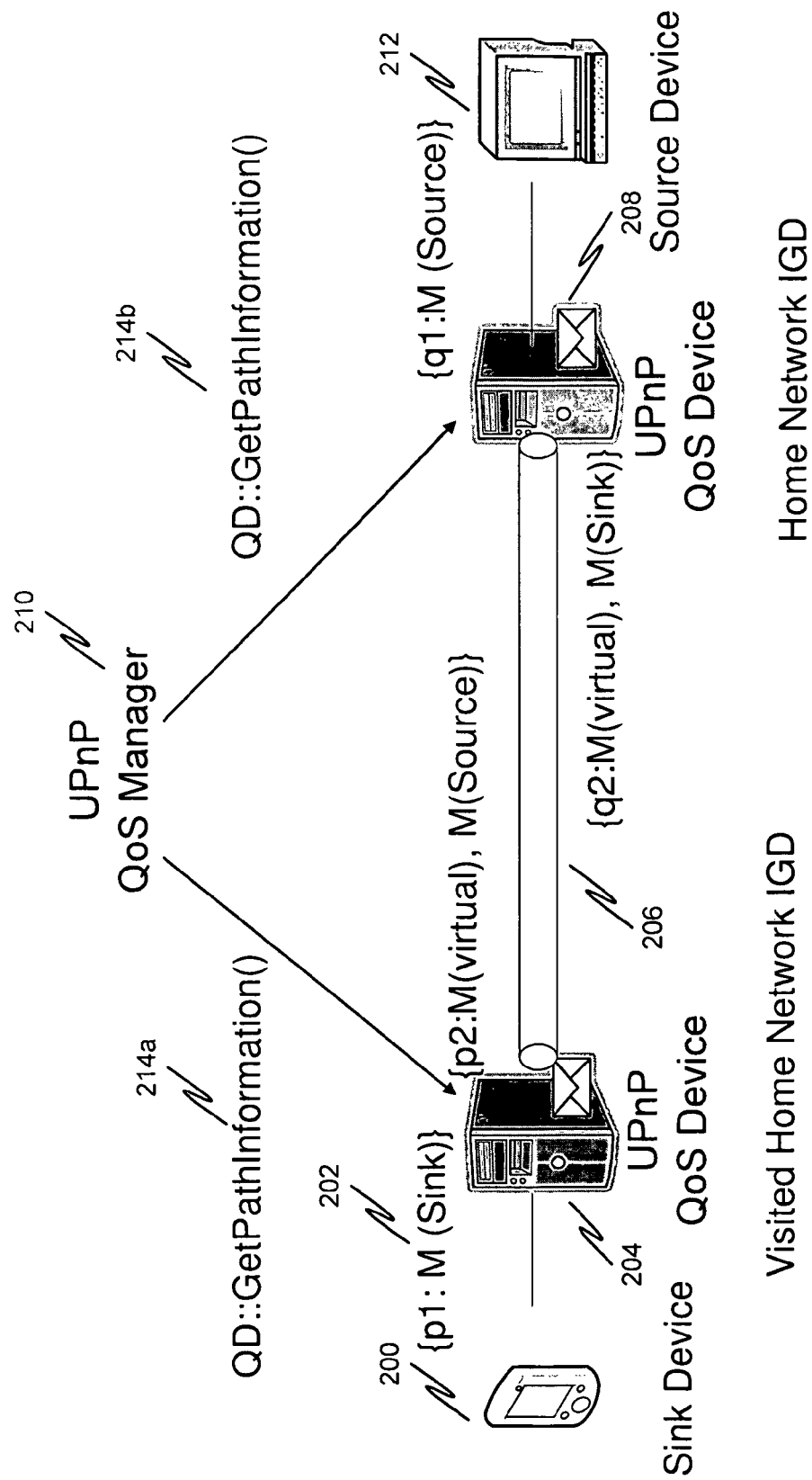
FIG. 2 is a diagram illustrating a method for reserving resources for a traffic stream in accordance with another embodiment of the present invention.

FIG. 2 is a diagram illustrating another example of reserving bandwidth in a VPN. A virtual A sink device 200 sends a request along interface 202 to a QoS device 204 in a visited home network. This may be, for example, a home network at a friend's house. The QoS device 204 may attempt to set up a VPN 206 with a QoS device 208 on the user's home network. A QoS Manager 210 may collect information, including path information 214a, 214b from both QoS devices 204, 208 in order to aid in reserving the right resources for VPN 206, This allows sink device 200 to communication with source device 212 over VPN using QoS.

Figure 3:
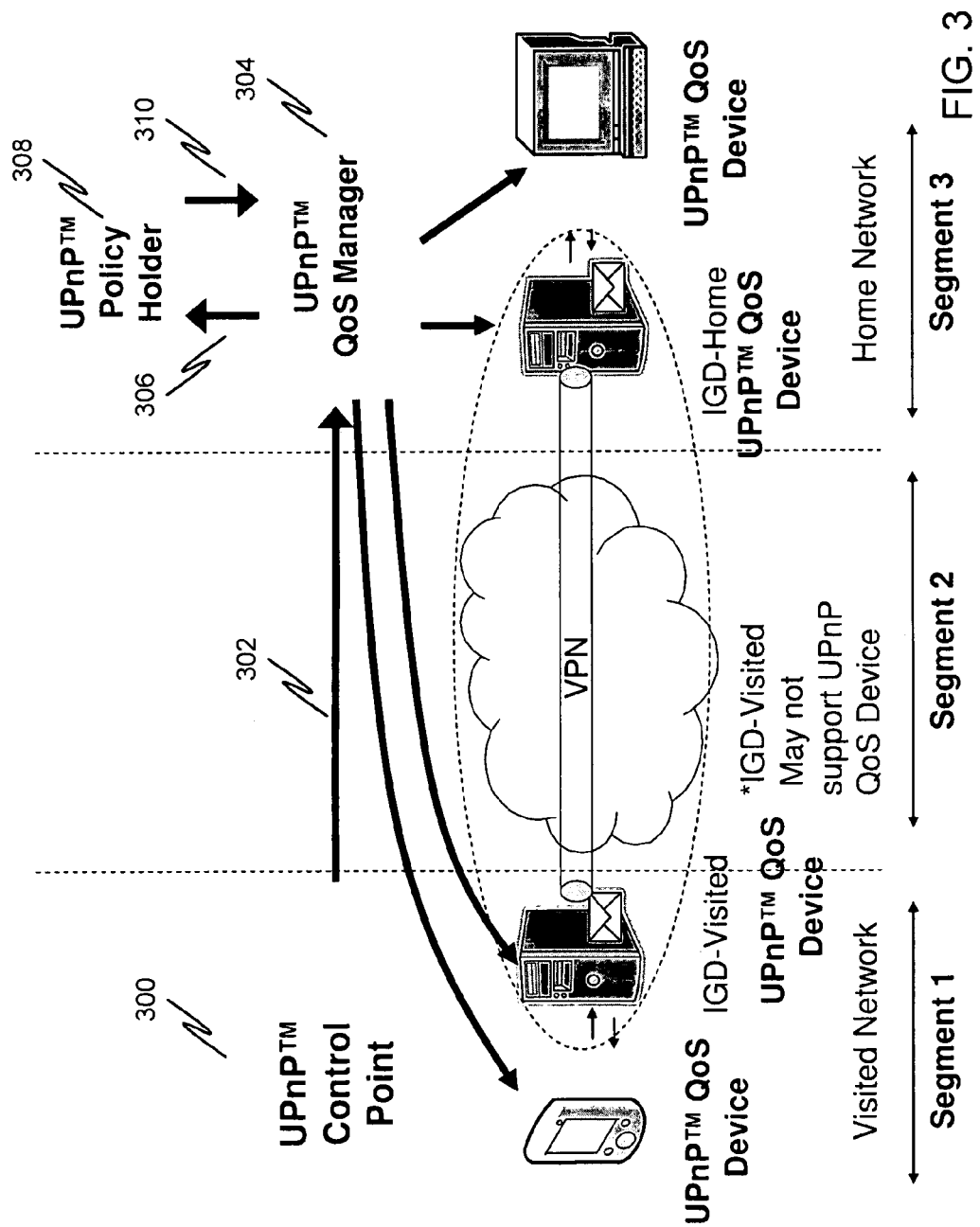
FIG. 3 is a flow diagram illustrating an example of reserving bandwidth for establishing Quality of Service in a home network in accordance with an embodiment of the present invention.

FIG. 3 is a diagram illustrating a method for reserving resources for a traffic stream in accordance with another embodiment of the present invention. The UPnP Control point 300 sends a QoS request 302 for a given traffic stream. The UPnP QoS Manager 304 receives the QoS request 302 and sends a request 306 to the UPnP Policy Holder 308 to obtain the traffic policy for the requested traffic stream. The UPnP Policy Holder 308 retrieves the traffic policy 310 and returns it to UPnP QoS Manager 304. The UPnP QoS Manager 304 then reserves resources to achieve end-to-end communication for the traffic stream.

In an embodiment of the present invention, an IGD in the home network is modeled as a UPnP QoS device with virtual interface(s) towards WAN. This interface becomes active when VPN is established from a remote UPnP client (remote access client). Note that there can be a number of virtual interfaces terminating at WAN depending upon the number of VP connection(s). The OGD UPnP QoS device advertises its interface to the VPN as a virtual interface upon receiving a request to get path information from the QoS manager.

Figure 4:
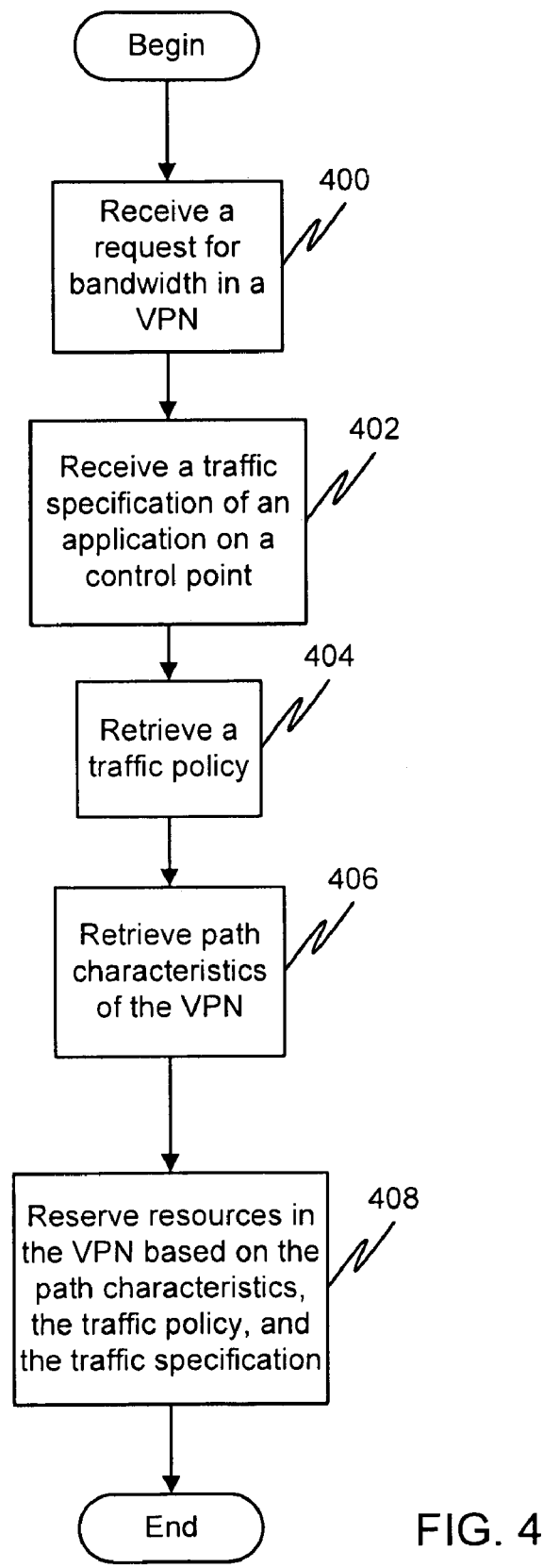
FIG. 4 is a flow diagram illustrating an example of reserving bandwidth for establishing Quality of Service in a home network in accordance with an embodiment of the present invention.

FIG. 4 is a flow diagram illustrating an example of reserving bandwidth for establishing Quality of Service in a home network in accordance with an embodiment of the present invention. This method may be executed, for example on a QoS manager in a UPnP network. At 400, a request for bandwidth in a virtual private network (VPN) is received. This request may be received from, for example, a control point. At 402, a traffic specification of an application on the control point may be received. This traffic specification may be received from, for example, the control point, via a UPnP Remote Access Transport Agent service or customized API. At 404, a traffic policy may be retrieved. This policy may be retrieved from a QoS policy holder. At 406, path characteristics of the VPN may be retrieved. This information may be retrieved directly from QoS devices to find the QoS devices, segments, and presence (or lack thereof) of VPN in the path. The path characteristics may include, for example, path latency and available bandwidth. At 408, resources in the VPN are reserved based on the path characteristics, the traffic policy, and the traffic specification.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for establishing Quality of Service (QoS) in a home network, the method comprising:
    receiving, from a remote home network device, a request for bandwidth for a virtual private network (VPN);
    establishing a VPN between an Internet gateway device in the home network and the remote home network device based upon the request for bandwidth;
    receiving, from the remote home network device, a traffic specification of an application running on the remote home network device;
    determining a control point in the home network to which the application running on the remote home network device needs to connect;
    establishing a non-VPN connection path between the Internet gateway device and the determined control point;
    retrieving a traffic policy;
    retrieving path characteristics of the VPN; and
    reserving resources in both the VPN and the non-VPN connection path based on the path characteristics, the traffic policy, and the traffic specification.

2. The method of claim 1, wherein the method is executed on a QoS manager in the home network.

3. The method of claim 1, wherein the home network is a network operating using the Universal Plug and Play (UPnP) standard.

4. The method of claim 3, wherein the traffic specification is received via a UPnP standard Remote Access Transport Agent (RATA) service.

5. The method of claim 1, wherein the traffic specification is received through a customized Application Programming Interface (API).

6. The method of claim 1, wherein the path characteristics include available bandwidth.

7. The method of claim 1, wherein the path characteristics include path latency.

8. The method of claim 1, further comprising:
requesting, from the control point, a specification of an application on the control point.

9. The method of claim 1, further comprising:
requesting a traffic policy from a policy holder.

10. The method of claim 1, further comprising:
requesting QoS devices along a path corresponding to the VPN for QoS Capabilities of the QoS devices.

11. A system for establishing Quality of Service (QoS) in a home network, the system comprising:
an Internet gateway device configured to establish a VPN between the Internet gateway device and a remote home network device;
one or more control points, connected to the Internet gateway device via the home network without a VPN;
one or more QoS devices;
a QoS manager coupled to the Internet Gateway device, the one or more control points and the one or more QoS devices, the QoS manager configured to:
receive, from the remote home network device, a traffic specification of an application running on the remote home network device;
determine a control point in the home network to which the application running on the remote home network device needs to connect;
retrieve a traffic policy;
retrieve path characteristics of the VPN; and
reserve resources in the VPN and on the non-VPN connection between the Internet gateway device and the control point based on the path characteristics, the traffic policy, and the traffic specification.

12. The system of claim 11, further comprising a policy holder coupled to the QoS manager.

13. The method of claim 1, wherein the QoS Manager is located on an Internet Gateway Device (IGD).

14. A system for establishing Quality of Service (QoS) in a home network, the system comprising:
means for receiving, from a remote home network device, a request for bandwidth for a virtual private network (VPN);
means for establishing a VPN between an Internet gateway device in the home network and the remote home network device based upon the request for bandwidth;
means for receiving, from the remote home network device, a traffic specification of an application running on the remote home network device;
means for determining a control point in the home network to which the application running on the remote home network device needs to connect;
means for establishing a non-VPN connection path between the Internet gateway device and the determined control point;
means for retrieving a traffic policy;
means for retrieving path characteristics of the VPN; and
means for reserving resources in both the VPN and the non-VPN connection path based on the path characteristics, the traffic policy, and the traffic specification.

15. A non-transitory program storage device readable by a machine tangibly embodying a program of instructions executable by the machine to perform a method for establishing Quality of Service (QoS) in a home network, the method comprising:
receiving, from a remote home network device, a request for bandwidth for a virtual private network (VPN);
establishing a VPN between an Internet gateway device in the home network and the remote home network device based upon the request for bandwidth;
receiving, from the remote home network device, a traffic specification of an application running on the remote home network device;
determining a control point in the home network to which the application running on the remote home network device needs to connect;
establishing a non-VPN connection path between the Internet gateway device and the determined control point;
retrieving a traffic policy;
retrieving path characteristics of the VPN; and
reserving resources in both the VPN and the non-VPN connection path based on the path characteristics, the traffic policy, and the traffic specification.

* * * * *